Jan. 18, 1955   R. P. CULBERTSON ET AL   2,700,091
FLUX
Filed Oct. 12, 1953
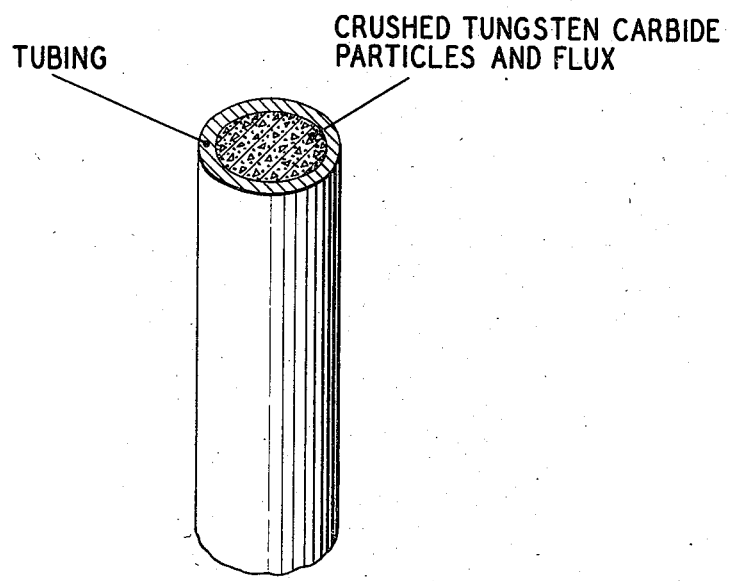
INVENTORS
RUSSEL P. CULBERTSON
CURTIS F. FOUCH
BY
ATTORNEY

United States Patent Office 2,700,091
Patented Jan. 18, 1955

2,700,091

FLUX

Russel P. Culbertson and Curtis F. Fouch, Kokomo, Ind., assignors to Union Carbide and Carbon Corporation, a corporation of New York Application October 12, 1953, Serial No. 385,432

2 Claims. (Cl. 219—8)

This invention relates to electric welding. More particularly, this invention relates to fluxes used in metallic arc deposition of hard facing overlays of tungsten carbides on metal articles.

The deposition of wear-resistant substances in a relatively soft metal matrix onto metal articles is well known in the art. Such hard facing finds wide industrial application, for example, tool-facing, welded tool joints in the oil well industry, in short, wherever a surface resistant to wear is desired. In the use of tungsten carbides for hard facing, the common practice utilizes an electrode composed of a metal tube filled with crushed tungsten carbide particles and a flux. The tube and the alloying metal work-piece form a relatively soft matrix wherein are held numerous small particles of the wear-resistant tungsten carbides. Efficiency and economy demand that such deposition of tungsten carbides have all the well-known desirable features associated with welding and particularly with hard-facing, such as minimum porosity, solid weld bead, good particle retention, uniformity of particle dispersion, to mention only a few. These desirable features are largely dependent on the flux used.

It is the object of this invention to provide a flux for use in metallic arc deposition of tungsten carbide particles on metal workpieces.

The flux of the invention comprises substantially the composition, by weight, 18% to 22% nickel-zirconium alloy (having substantially the composition: 45% nickel, 26% zirconium, 17% aluminum, 4% iron, 4% silicon), 27% to 33% graphite, 23% to 27% iron oxide (Hematite), 9% to 11% potassium metaborate (dehydrated), 4% to 6% alumina, 4% to 6% magnesia, and 4% to 6% lithium metaborate ($LiB_4O_7.5H_2O$). A preferred composition comprises, by weight: 19% to 21% nickel-zirconium alloy (having substantially the composition: 45% nickel, 26% zirconium, 17% aluminum, 4% iron, 4% silicon), 29% to 31% graphite, 24% to 26% iron oxide (Hematite), 9% to 11% potassium metaborate (dehydrated), 4% to 6% alumina, 4% to 6% magnesia, and 4% to 6% lithium metaborate ($LiB_4O_7.5H_2O$).

The flux of the invention is designed to be used as a mixture with crushed tungsten carbide particles contained in a preformed or continuously formed metal tube. The flux may be present in a range from 1.5% to 4% of the total weight of the tube and tungsten carbide filler, a preferred range being from 2% to 3%.

The accompanying drawing is of a preferred form of the invention, showing in combination, a welding electrode, comprising a metal tube containing a filler of crushed tungsten carbide particles and the flux of the invention.

The components of the flux are believed to have the following functions: the nickel-zirconium acts as a stabilizer and deoxidizer. The graphite forms an atmosphere of CO and $CO_2$, supplies excess carbon, thereby preventing breakdown of the tungsten carbides. The iron oxide is an arc stabilizer. The metaborates of lithium and sodium are both fluxes and stabilizers. The alumina and magnesia increase the burn-off rate.

The advantages of the flux of the invention result from the foregoing functions. Among the advantages to be noted are a high deposition rate, a stable arc manifesting itself by even burn-off and uniform ionization rate, operation at lower than average current and voltage settings, and the ultimate advantage of increased tungsten carbide particle retention. Further, the flux of the invention permits deposition of larger size particles of tungsten carbide and this retention extends to the extreme edge of the deposit, both of which materially increase the abrasive resistance of the deposit.

A comparison of a tungsten carbide-containing electrode using the flux of the invention with a commercially available competitive electrode of the same type serves to point out the success of the subject invention. Weld deposits examined by X-ray show that larger size particles are retained and this retention extends to the extreme edge when the flux of the invention is used, being much superior in these respects to the competitive electrode. A comparison of deposition rates, using a ¼ inch electrode at 250 amperes in each case, shows an average deposition rate of 97.0 grams per minute using the flux of the invention to an average rate of 93.0 grams per minute of the competitive electrode.

A welding flux within the limits of this invention that has given highly satisfactory results has the following composition, by weight: 20% nickel-zirconium alloy (having substantially the composition: 45% nickel, 26% zirconium, 17% aluminum, 4% iron, 4% silicon), 30% graphite, 25% iron oxide (Hematite), 10% potassium metaborate (dehydrated), 5% alumina, 5% magnesia, and 5% lithium metaborate ($LiB_4O_7.5H_2O$).

A welding electrode containing crushed tungsten carbide particles using the flux of the invention may be operated either with direct or alternating current although direct current is to be preferred. It is to be noted that straight polarity is not recommended in using a welding electrode containing crushed tungsten carbide particles and the flux of the invention.

What is claimed is:

1. Welding flux for use in metallic arc deposition of tungsten carbide particles in a relatively soft matrix, having essentially the composition, by weight, 18% to 22% nickel-zirconium alloy (having substantially the composition: 45% nickel, 26% zirconium, 17% aluminum, 4% iron, 4% silicon), 27% to 33% graphite, 23% to 27% iron oxide (Hematite), 9% to 11% potassium metaborate (dehydrated), 4% to 6% alumina, 4% to 6% magnesia, and 4% to 6% lithium metaborate ($LiB_4O_7.5H_2O$).

2. Welding electrode for hard-facing comprising, in combination, a metal tube containing a core of tungsten carbide particles and a flux, said flux being present in a range from 1.5% to 4% of the total weight of said tube and said tungsten carbide particles; said flux having essentially the composition, by weight, 18% to 22% nickel-zirconium alloy (having substantially the composition: 45% nickel, 26% zirconium, 17% aluminum, 4% iron, 4% silicon), 27% to 33% graphite, 23% to 27% iron oxide (Hematite), 9% to 11% potassium metaborate (dehydrated), 4% to 6% alumina, 4% to 6% magnesia, and 4% to 6% lithium metaborate ($LiB_4O_7.5H_2O$).

References Cited in the file of this patent

UNITED STATES PATENTS 2,003,020    Strobel ------------------ May 28, 1935